United States Patent
Matsumoto

(10) Patent No.: US 9,264,701 B2
(45) Date of Patent: Feb. 16, 2016

(54) VIDEO DISPLAY APPARATUS AND VIDEO DISPLAY METHOD

(71) Applicant: SEIKO EPSON CORPORATION, Tokyo (JP)

(72) Inventor: Morio Matsumoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 345 days.

(21) Appl. No.: 13/772,713

(22) Filed: Feb. 21, 2013

(65) Prior Publication Data

US 2013/0229501 A1    Sep. 5, 2013

(30) Foreign Application Priority Data

Mar. 2, 2012   (JP) ................................ 2012-046907

(51) Int. Cl.
*H04N 13/04*  (2006.01)
*H04N 13/00*  (2006.01)

(52) U.S. Cl.
CPC ....... *H04N 13/0452* (2013.01); *H04N 13/0029* (2013.01); *H04N 13/0438* (2013.01)

(58) Field of Classification Search
None
See application file for complete search history.

(56) References Cited

U.S. PATENT DOCUMENTS

| | | | |
|---|---|---|---|
| 2009/0080789 A1 | 3/2009 | Shoji | |
| 2011/0175978 A1 | 7/2011 | Ito | |
| 2011/0221871 A1 | 9/2011 | Sakaniwa et al. | |
| 2012/0026304 A1 | 2/2012 | Kawahara | |

FOREIGN PATENT DOCUMENTS

| | | |
|---|---|---|
| JP | 2009058785 A | 3/2009 |
| JP | 2011150144 A | 8/2011 |
| JP | 2011191347 A | 9/2011 |
| JP | 2011217173 A | 10/2011 |
| JP | A-2011-257562 | 12/2011 |
| JP | A-2012-29220 | 2/2012 |

*Primary Examiner* — Kate Luo
(74) *Attorney, Agent, or Firm* — Oliff PLC

(57) ABSTRACT

A video display apparatus includes a display section that carries out a display process based on a drive signal and a drive section that outputs to the display section a first drive signal based on a video signal having undergone video processing in a first video processing section at a fixed cycle and a second drive signal based on a video signal having undergone video processing in a second video processing section at the same cycle as the cycle at which the first drive signal is outputted but at timing shifted from the first drive signal by one-half the cycle. When the video signals contain two-dimensional video images, the first video processing section produces a video signal for two-dimensional video images and the second video processing section produces a video signal for black screen insertion.

4 Claims, 7 Drawing Sheets

VIDEO DISPLAY APPARATUS AND VIDEO DISPLAY METHOD

BACKGROUND

1. Technical Field

The present invention relates to a video display apparatus capable of displaying stereoscopic video images and a video display method.

2. Related Art

There is a known video display apparatus of related art that allows stereoscopic vision by using active shutter glasses that alternately display video images for the right eye and video images for the left eye having parallax therebetween at high speed (for example, 60 frames/second for each eye or 120 frames/second for right and left eyes together) and alternately open and close right and left shutters in synchronization with the alternate right and left display operation (see JP-A-2012-029220, for example).

On the other hand, in a display apparatus that operates in a hold-type display mode, such as a liquid crystal display, unlike a display apparatus that operates in an impulse-type display mode, such as a CRT (cathode ray tube), holding operation of the same video image during a single frame period causes the contour of an image of a moving object on a display screen to be blurred, what is called motion picture blurring. To reduce the degree of the motion picture blurring, for example, there is a known black screen insertion method for providing a pseudo-impulse display mode by inserting a black screen between frames (see JP-A-2011-257562, for example). Disadvantages of the black screen introduction method are insufficient brightness and screen flickering at a typical frame rate (60 frames/second). The insufficient brightness and flickering are suppressed by increasing the frame rate to 120 frames/second and inserting black screens as the added frames.

In the video display apparatus described above, it is conceivable to achieve stereoscopic vision by providing two video processing sections, outputting a first drive signal based on a video signal for the right eye having undergone video processing in a first video processing section to a display section at a fixed cycle ($1/60$ seconds, for example), and outputting a second drive signal based on a video signal for the left eye having undergone video processing in a second video processing section to the display section at the same cycle as the cycle at which the first drive signal is outputted ($1/60$ seconds) but at the timing shifted from the first drive signal by one-half the cycle ($1/120$ seconds) to alternately display images for the right eye and images for the left eye (60 frames/second for each eye or 120 frames/second for right and left eyes together). When an inputted video signal is a two-dimensional video signal, it is conceivable to display two-dimensional video images by displaying only video images based on a video signal produced by one of the video processing sections. In this case as well as the case described above, since the frame rate at which the two-dimensional video images are displayed may be the same as the frame rate at which video images for each of the right and left eyes are displayed in the stereoscopic video display (60 frames/second), a drive signal based on a video signal for two-dimensional video images having undergone video processing in one of the video processing sections may be outputted at the same cycle as that used in the stereoscopic video display ($1/60$ seconds).

In the video display apparatus described above, however, inserting black screens when two-dimensional video images are displayed disadvantageously results in insufficient brightness and flickering. It is conceivable in this case to insert black screens at high speed by outputting the drive signal based on the video signal for two-dimensional video images having undergone video processing in one of the video processing sections at a cycle shorter than that used in the stereoscopic video display ($1/120$ seconds, for example), which, however, requires, for example, a dedicated drive circuit and control process.

SUMMARY

An advantage of some aspects of the invention is to provide a video display apparatus not only capable of alternately displaying images for the right eye and images for the left eye for stereoscopic vision but also capable of displaying two-dimensional video images by using the same video output method as that used to display the stereoscopic images in such a way that black screens can be inserted without insufficient brightness or flickering and the degree of motion picture blurring is reduced. Another advantage of some aspects of the invention is to provide a video display method.

An aspect of the invention is directed to a video display apparatus including a display section that carries out a display process based on a drive signal, a signal acquisition section that acquires a video signal, a video processing section including a first video processing section and a second video processing section that each perform video processing on the acquired video signal, and a drive section that outputs to the display section a first drive signal based on the video signal having undergone the video processing in the first video processing section at a fixed cycle and a second drive signal based on the video signal having undergone the video processing in the second video processing section at the same cycle as the cycle at which the first drive signal is outputted but at timing shifted from the first drive signal by one-half the cycle. When the acquired video signal contains stereoscopic video images, the first image processing section of the video processing section produces a video signal for one of the right and left eyes and the second video processing section of the video processing section produces a video signal for the other one of the right and left eyes, whereas when the acquired video signal contains two-dimensional video images, the first video processing section of the video processing section produces a video signal for two-dimensional video images and the second video processing section of the video processing section produces a video signal for black screen insertion.

Another aspect of the invention is directed to a video display method including acquiring a video signal, performing video processing on the acquired video signal in each of a first video processing section and a second video processing section, and outputting to a display section that carries out a display process based on a drive signal a first drive signal based on the video signal having undergone the video processing in the first video processing section at a fixed cycle and a second drive signal based on the video signal having undergone the video processing in the second video processing section at the same cycle as the cycle at which the first drive signal is outputted but at timing shifted from the first drive signal by one-half the cycle. In the performing of the video processing, when the acquired video signal contains stereoscopic video images, the first video processing section produces a video signal for one of the right and left eyes and the second video processing section produces a video signal for the other one of the right and left eyes, whereas when the acquired video signal contains two-dimensional video images, the first video processing section produces a video signal for two-dimensional video images and the second video processing section produces a video signal for black screen insertion.

According to the configuration described above, when the acquired video signal contains stereoscopic video images, the drive section alternately outputs the first drive signal based on the video signal for one of the right and left eyes produced by the first video processing section and the second drive signal based on the video signal for the other one of the right and left eyes produced by the second video processing section, and the display section alternately displays video images for the right eye and video images for the left eye. In this case, when each of the first drive signal and the second drive signal is outputted at a cycle of 1/60 seconds, the video images for the right eye are displayed at a frame rate of 60 frames/second and so are the video images for the left eye, or the video images for the right eye and the video images for the left eye are displayed at a frame rate of 120 frames/second.

On the other hand, when the acquired video signal contains two-dimensional video images, the drive section alternately outputs the first drive signal based on the video signal for two-dimensional video images that has been produced by the first video processing section and the second drive signal based on the video signal for black screen insertion that has been produced by the second video processing section, and the display section performs black screen insertion, that is, alternately displays the two-dimensional video images and the video images for black screen insertion. In this case as well as the case described above, each of the first drive signal and the second drive signal is outputted at the cycle of 1/60 seconds, which is the same cycle as that used in the stereoscopic video display, and the two-dimensional images are displayed at the frame rate of 60 frames/second and so are the video images for black screen insertion, or the two-dimensional images and the video images for black screen insertion are displayed at the frame rage of 120 frames/second. That is, when two-dimensional video images are displayed, using the second drive signal (second video processing section), which is not essentially required for the two-dimensional video display, allows black screen insertion to be performed at high speed without shortening of the output cycle of the first drive signal, which has been produced based on the video signal having undergone the video processing in the first video processing section. Therefore, when two-dimensional video images are displayed, black screens can be inserted without insufficient brightness or flickering only by producing a video signal for black screen insertion in the second video processing section in the same video processing method as that used in the stereoscopic image display except the generation of the video signal for black screen insertion. The degree of motion picture blurring can thus be reduced.

The video signal for black screen insertion is not limited to a video signal corresponding to black screens but may alternatively be a video signal corresponding to an intermediate grayscale, such as gray, in order to prevent the brightness from decreasing.

In this case, the video display apparatus preferably further includes a black screen insertion choice section for choosing whether or not black screens are inserted when two-dimensional video images are displayed, and the drive section preferably outputs the first drive signal at the fixed cycle but does not output the second drive signal when the black screen insertion choice section is used to choose not to insert black screens.

According to the configuration described above, when the black screen insertion choice section is used to choose not to insert black screens, the drive section outputs the first drive signal based on the video signal for two-dimensional video images but does not output the second drive signal based on the video signal for black screen insertion. As a result, two-dimensional video images with no black screens inserted can be displayed. Therefore, a user can choose whether or not black screens are inserted in the display operation, whereby the convenience of the user can be improved.

In this case, the second video processing section may produce a video signal for black screen insertion but the drive section may output no second drive signal based on the produced video signal for black screen insertion, or the second image processing section may produce no video signal for black screen insertion at all.

In this case, the video display apparatus preferably further includes a stereoscopic display choice section for choosing whether stereoscopic video images contained in the acquired video signal are displayed as stereoscopic video images or two-dimensional video images, and when the stereoscopic display choice section is used to choose to display the stereoscopic video images as two-dimensional video images, the second video processing section of the video processing section preferably produces a video signal for black screen insertion instead of the video signal for the other one of the right and left eyes.

According to the configuration described above, the drive section alternately outputs the first drive signal based on the video signal for one of the right and left eyes that has been produced by the first video processing section and the second drive signal based on the video signal for black screen insertion that has been produced by the second video processing section, and the display section performs black screen insertion, that is, alternately displays video images for the right eye and video images for black screen insertion. In this case, the user recognizes the video images for the one of the right and left eyes as normal two-dimensional images. Therefore, when the user desires not to display a stereoscopic video displayable content as stereoscopic video images but desires to display the stereoscopic video images as two-dimensional video images, black screens can be inserted as in the case where a video signal containing two-dimensional video images is acquired.

In this case, the video display apparatus preferably further includes a black screen insertion choice section for choosing whether or not black screens are inserted when two-dimensional video images are displayed, and when the stereoscopic display choice section is used to choose to display the stereoscopic video images as two-dimensional video images and the black screen insertion choice section is used to choose not to insert black screens, the drive section preferably outputs the first drive signal at the fixed cycle but does not output the second drive signal.

According to the configuration described above, the drive section outputs the first drive signal based on the video signal for one of the right and left eyes that has been produced by the first video processing section but outputs no second drive signal based on the video signal for black screen insertion that has been produced by the second video processing section. As a result, no black screen is inserted, but only the video images for the one of the right and left eyes (recognized by the user as normal two-dimensional images) can be displayed. Therefore, the user can choose whether or not black screens are inserted in the display operation, whereby the convenience of the user can be improved.

In this case, the second video processing section may produce a video signal for black screen insertion but the drive section may output no second drive signal based on the produced video signal for black screen insertion, or the second image processing section may produce no video signal for black screen insertion at all.

BRIEF DESCRIPTION OF THE DRAWINGS

The invention will be described with reference to the accompanying drawings, wherein like numbers reference like elements.

DESCRIPTION OF EXEMPLARY EMBODIMENTS

A video display apparatus and a video display method according to an embodiment of the invention will be described below with reference to the accompanying drawings. In the present embodiment, a projector is presented by way of example of the video display apparatus. The projector displays video images in such a way that they are recognized as stereoscopic video images by alternately displaying (projecting) video images for the right eye and video images for the left eye each being a two-dimensional video image and having parallax therebetween (frame sequential method) on a screen or any other surface. A person who looks at the projected video images can view stereoscopic video images by wearing an active shutter glasses (liquid crystal shutter glasses) that alternately open and close right and left shutters in synchronization with the alternate right and left display operation.

Figure 1:
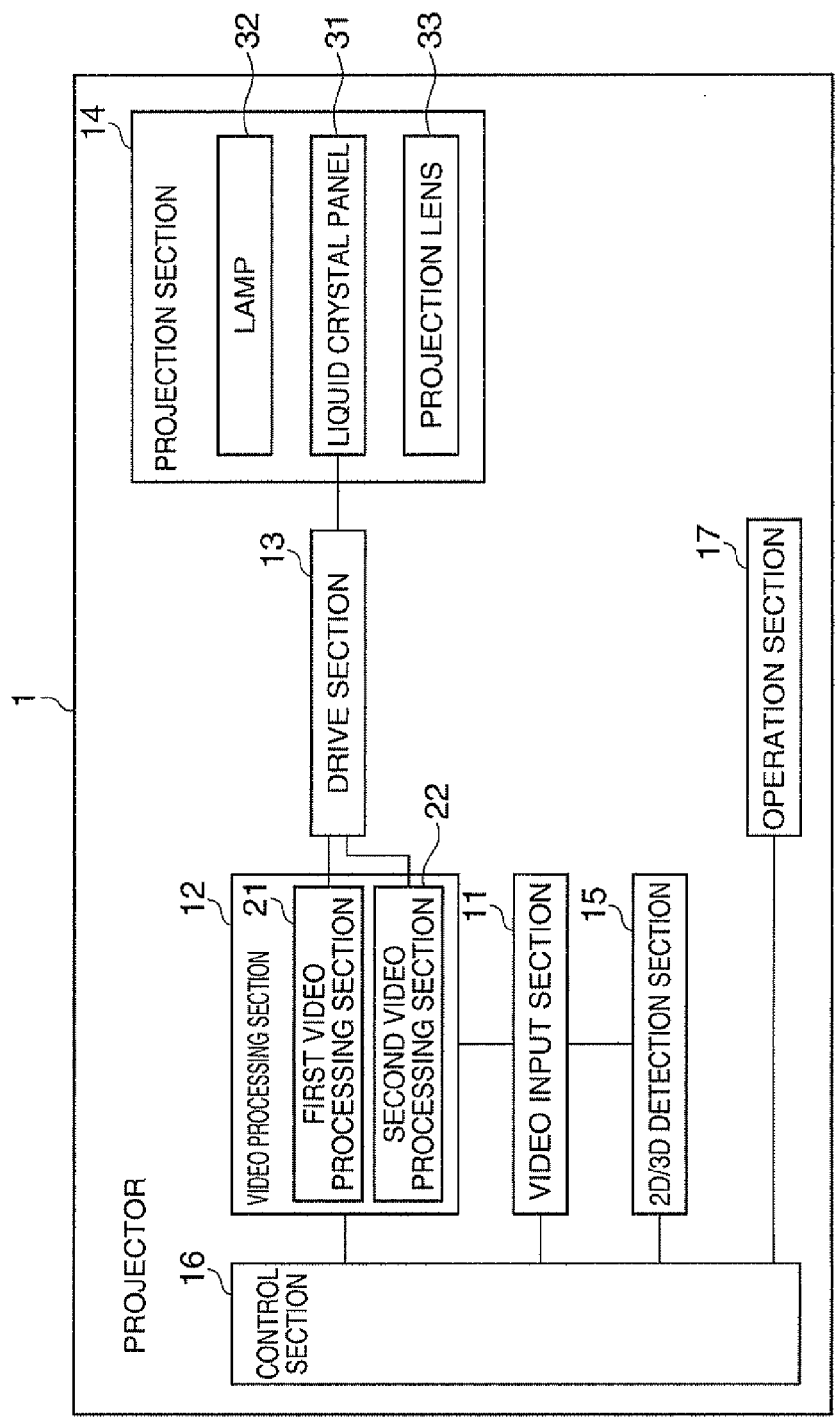
FIG. 1 is a block diagram of a projector according to an embodiment of the invention.

The projector 1 includes a video input section 11, a video processing section 12, a drive section 13, a projection section 14, a 2D/3D detection section 15, a control section 16, and an operation section 17, as shown in FIG. 1.

The video input section 11 receives video data as an input from a personal computer, a video player, or any other external apparatus or a USB memory or any other external storage medium and acquires a video signal. The inputted video data contains 2D/3D identification information representing whether the inputted content is two-dimensional video images or stereoscopic video images. Further, when the inputted content is stereoscopic video images, the video input section 11 sequentially extracts a video signal for the right eye and a video signal for the left eye on a frame basis and outputs the extracted video signals to the video processing section 12.

The video processing section 12 includes a first video processing section 21 to which the video signal for the right eye outputted on a frame basis from the video input section 11 is inputted and a second video processing section 22 to which the video signal for the left eye outputted on a frame basis from the video input section 11 is inputted. It is, of course, noted that the video signal for the left eye outputted from the video input section 11 may be inputted to the first video processing section 21 and the video signal for the right eye outputted from the video input section 11 may be inputted to the second video processing section 22.

Each of the first video processing section 21 and the second video processing section 22 is formed of a video processor that performs various types of video processing computation in response to an instruction from the control section 16 and converts an inputted video signal into a signal expressed in a format displayable by a liquid crystal panel 31 (which will be described later) in the projection section 14. The first video processing section 21 performs video processing on the video signal for the right eye outputted on a frame basis from the video input section 11 and outputs the processed video signal to the drive section 13, and the second video processing section 22 performs video processing on the video signal for the left eye outputted on a frame basis from the video input section 11 and outputs the processed video signal to the drive section 13.

The drive section 13, which is formed of a panel drive IC (integrated circuit) that drives the liquid crystal panel 31 in the projection section 14, outputs a first drive signal based on the video signal for the right eye outputted on a frame basis from the first video processing section 21 at a fixed cycle ($1/60$ seconds) and outputs a second drive signal based on the video signal for the left eye outputted on a frame basis from the second video processing section 22 at the same cycle as the cycle at which the first drive signal is outputted ($1/60$ seconds) but at the timing shifted from the first drive signal by one-half the cycle. That is, the drive section 13 alternately outputs the first drive signal based on the video signal for the right eye and the second drive signal based on the video signal for the left eye to the liquid crystal panel 31 at a cycle of $1/120$ seconds.

The projection section 14 includes the liquid crystal panel 31 driven by the drive signals outputted from the drive section 13, a lamp 32 that works as a light source, and a projection lens 33 that enlarges and projects modulated light (video images) produced by the liquid crystal panel 31 that modulates the light from the lamp 32 on a screen or any other surface. The liquid crystal panel 31 functions as a display section operating in a hold-type display mode and holds the same video image during a one-frame period.

As described above, when the drive section 13 alternately outputs the first drive signal based on the video signal for the right eye and the second drive signal based on the video signal for the left eye to the liquid crystal panel 31, the projection section 14 alternately displays images for the right eye and images for the left eye (at 60 frames/second for each eye or 120 frames/second for right and left eyes together).

The 2D/3D detection section 15 refers to the 2D/3D identification information in the video signal inputted to the video input section 11, detects whether the inputted video signal contains two-dimensional video images or stereoscopic video images, and outputs the detection result to the control section 16.

The control section 16, which includes a CPU (central processing unit) that performs various types of computation; a ROM (read only memory) that stores an OS (operating system), which is basic software, and control programs and control data used by the CPU to perform the computation; and a RAM (random access memory) used as a work area when the CPU performs the various types of computation, oversees and controls the projector 1.

The operation section 17 includes an operation panel provided on the body of the projector 1 and a remote control for remotely operating the body of the projector 1. Each of the operation panel and the remote control has a group of operation parts for various types of operation, and the group of operation parts include a power on/off button, a menu button for displaying an environment setting menu in an OSD (on-screen display) mode, and a return button for finalizing an item selected, for example, from the environment setting menu. The environment setting menu allows a user to choose, for example, whether or not black screens are inserted and choose whether or not a stereoscopic video content is displayed as stereoscopic video images.

Figure 2:
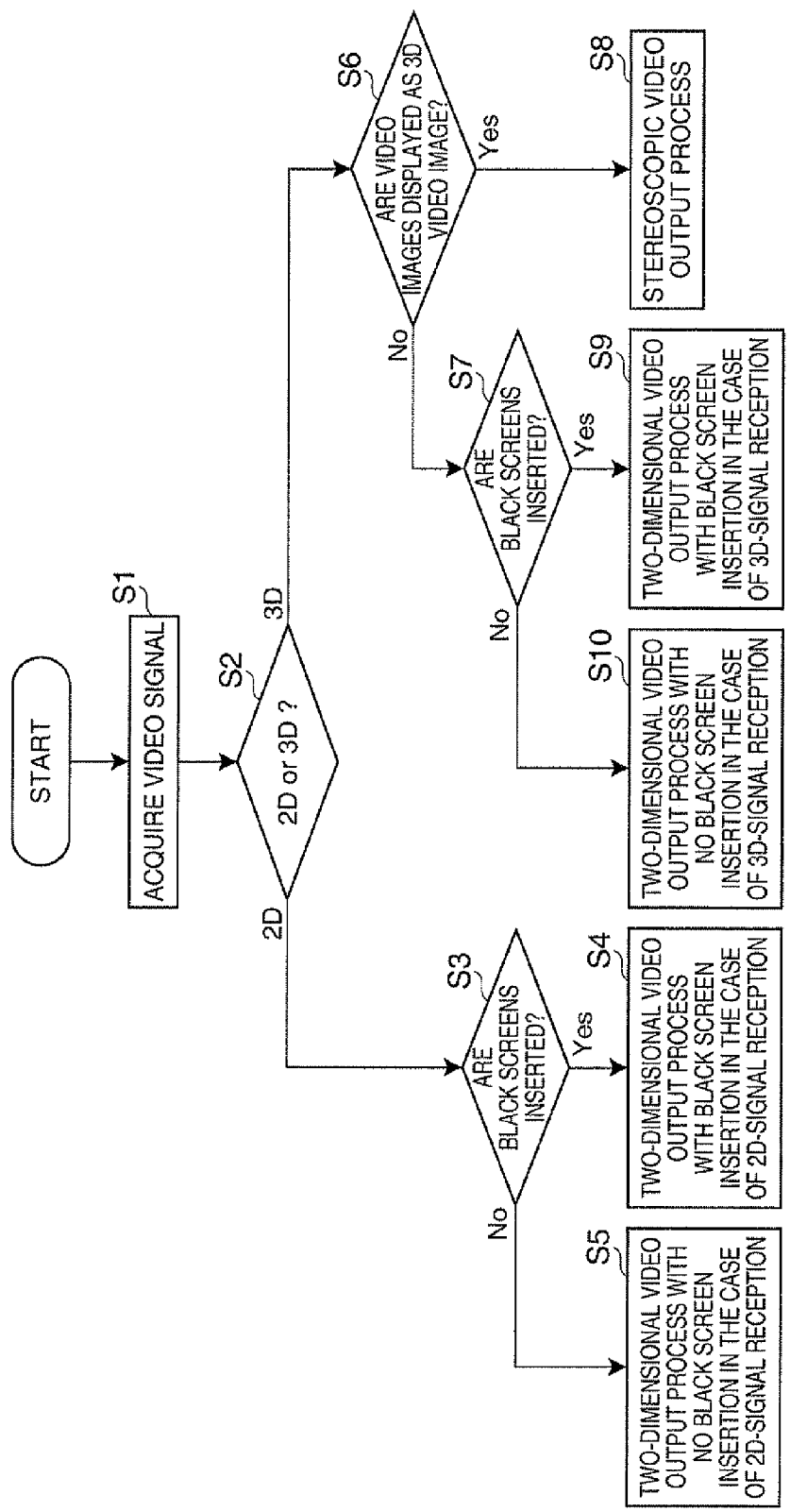
FIG. 2 is a flowchart showing a process procedure for determining a video output process carried out by the projector based on various types of selection.

A description will be made of a process procedure for determining a video output process carried out by the projector 1 based on various types of selection made in the environment setting menu with reference to FIG. 2. In the projector 1, when the video input section 11 acquires a video signal (S1), the 2D/3D detection section 15 detects whether the video signal inputted to the video input section 11 contains two-dimensional video images or stereoscopic video images (S2). When the 2D/3D detection section 15 detects that the inputted video signal contains two-dimensional video images (S2; 2D), the control section 16 determines whether the user has set in the environment setting menu black screens to be inserted (S3). When the control section 16 determines that the user has set black screens to be inserted (S3; Yes), the projector 1 carries out a two-dimensional video output process with black screen insertion in the case of 2D-signal reception (see FIG. 4), which will be described later (S4). When the control section 16 determines that the user has set no black screen to be inserted (S3; No), the projector 1 carries out a two-dimensional video output process with no black screen insertion in the case of 2D-signal reception (see FIG. 5), which will be described later (S5).

On the other hand, in the projector 1, when the 2D/3D detection section 15 detects that the inputted video signal contains stereoscopic video images (S2; 3D), the control section 16 determines whether the user has set in the environment setting menu the video images to be displayed as stereoscopic video images (S6). When the control section 16 determines that the user has set the video images to be displayed as stereoscopic video images (S6; Yes), the projector 1 carries out a stereoscopic video output process (see FIG. 3), which will be described later (S8). When the control section 16 determines that the user has set the video images to be displayed as two-dimensional video images (S6; No), the control section 16 determines whether the user has set in the environment setting menu black screens to be inserted (S7). When the control section 16 determines that the user has set black screens to be inserted (S7; Yes), the projector 1 carries out a two-dimensional video output process with black screen insertion in the case of 3D-signal reception (see FIG. 6), which will be described later (S9). When the control section 16 determines that the user has set no black screens to be inserted (S7; No), the projector 1 carries out a two-dimensional video output process with no black screen insertion in the case of 3D-signal reception (see FIG. 7), which will be described later (S10). The projector 1 instructs the liquid crystal shutter glasses to open and close the shutters when carrying out the stereoscopic video output process, whereas instructing the liquid crystal shutter glasses not to open or close the shutters when carrying out the other video output processes.

Figure 3:
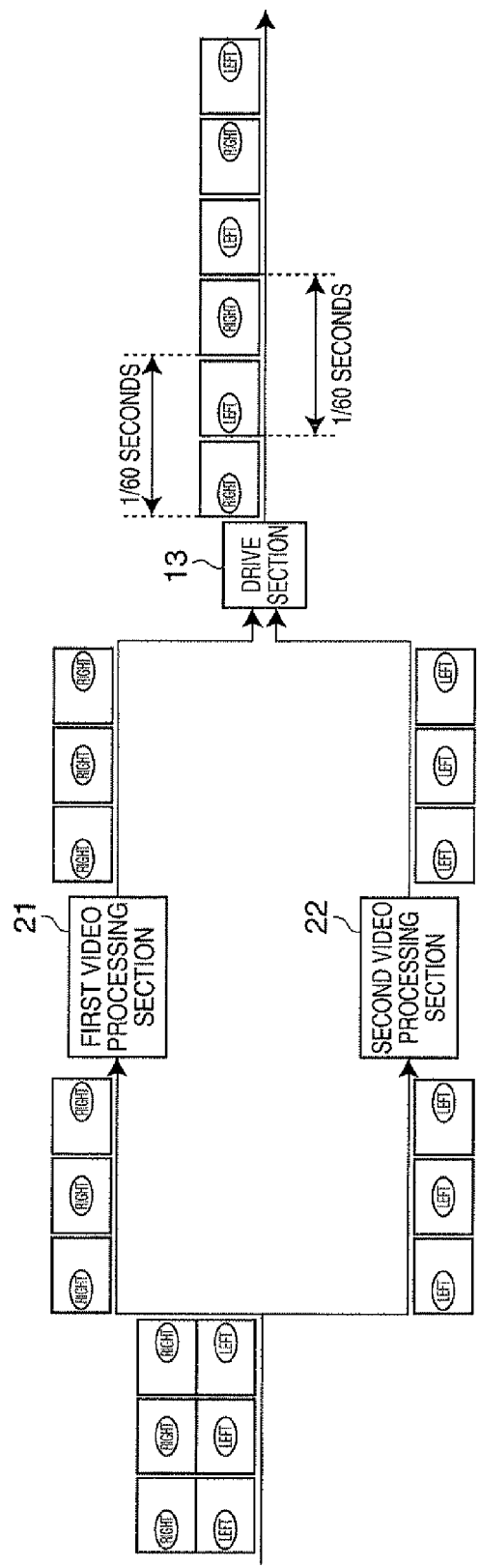
FIG. 3 describes a stereoscopic video output process carried out by the projector.

In the projector 1 that is carrying out the stereoscopic video output process, the video input section 11 outputs a video signal for the right eye to the first video processing section 21 and outputs a video signal for the left eye to the second video processing section 22, as shown in FIG. 3. The first video processing section 21 outputs the video signal for the right eye to the drive section 13, and the second video processing section 22 outputs the video signal for the left eye to the drive section 13. The drive section 13 then alternately outputs a first drive signal based on the video signal for the right eye produced by the first video processing section 21 and a second drive signal based on the video signal for the left eye produced by the second video processing section 22, and the projection section 14 alternately projects video images for the right eye and video images for the left eye. In this case, each of the first drive signal and the second drive signal is outputted at a cycle of $1/60$ seconds, and the video images for the right eye are displayed at a frame rate of 60 frames/second and so are the video images for the left eye, or the video images for the right and left eyes are displayed at a frame rate of 120 frames/second. In FIG. 3, although the video images for the right eye are labeled with "right" and the video images for the left eye are labeled with "left," the video images for the right eye and the video images for the left eye are in practice the same but displayed with parallax therebetween.

Figure 4:
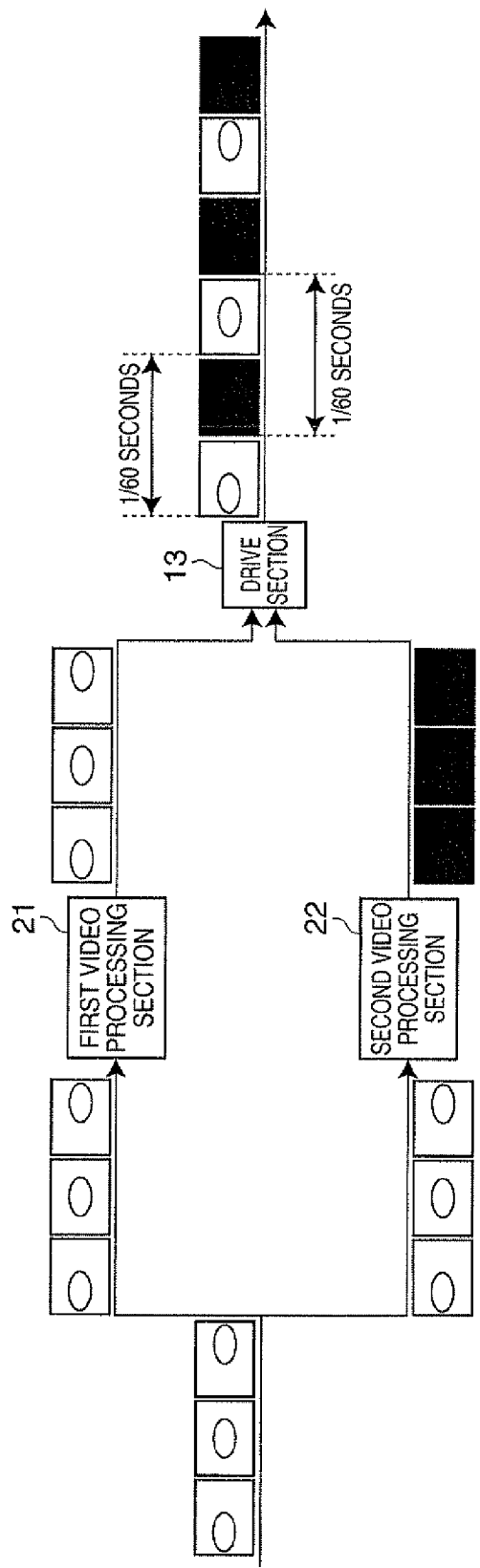
FIG. 4 describes a two-dimensional video output process with black screen insertion in the case of 2D-signal reception carried out by the projector.

In the projector 1 that is carrying out the two-dimensional video output process with black screen insertion in the case of 2D-signal reception, the video input section 11 outputs a video signal for two-dimensional video images to the first video processing section 21 and outputs the same video signal for two-dimensional video images to the second video processing section 22, as shown in FIG. 4. That is, the same video signal is inputted to the first video processing section 21 and the second video processing section 22. The first video processing section 21 then performs the same video processing as that performed in the stereoscopic video output process to produce a video signal for two-dimensional images. On the other hand, the second video processing section 22 produces a video signal for black screen insertion.

Subsequently, the drive section 13 alternately outputs a first drive signal based on the video signal for two-dimensional video images that has been produced by the first video processing section 21 and a second drive signal based on the video signal for black screen insertion that has been produced by the second video processing section 22. The projection section 14 then performs black screen insertion, that is, alternately displays the two-dimensional images and the video images for black screen insertion. In this case as well as the case described above, each of the first drive signal and the second drive signal is outputted at the cycle of $1/60$ seconds, which is the same cycle as that used in the stereoscopic video display, and the two-dimensional images are displayed at the frame rate of 60 frames/second and so are the video images for black screen insertion, or the two-dimensional images and the video images for black screen insertion are displayed at the frame rate of 120 frames/second. That is, when two-dimensional video images are displayed, using the second drive signal (second video processing section 22), which is not essentially required for the two-dimensional video display, allows black screen insertion to be performed at high speed without shortening of the output cycle of the first drive signal, which has been produced based on the video signal having undergone video processing in the first video processing section 21. Therefore, when two-dimensional video images are displayed, black screens can be inserted without insufficient brightness or flickering only by producing a video signal for black screen insertion in the second video processing section 22 in the same video processing method as that used in the stereoscopic image display except the generation of the video signal for black screen insertion. The degree of motion picture blurring can thus be reduced.

In the two-dimensional video output process with black screen insertion in the case of 2D signal reception, since the user wears no liquid crystal shutter glasses or the shutters are not opened or closed when the user wears the liquid crystal shutter glasses, the user visually recognizes with both eyes the alternately displayed two-dimensional video images and video images for black screen insertion. This holds true for the other video output processes except the stereoscopic video output process.

Figure 5:
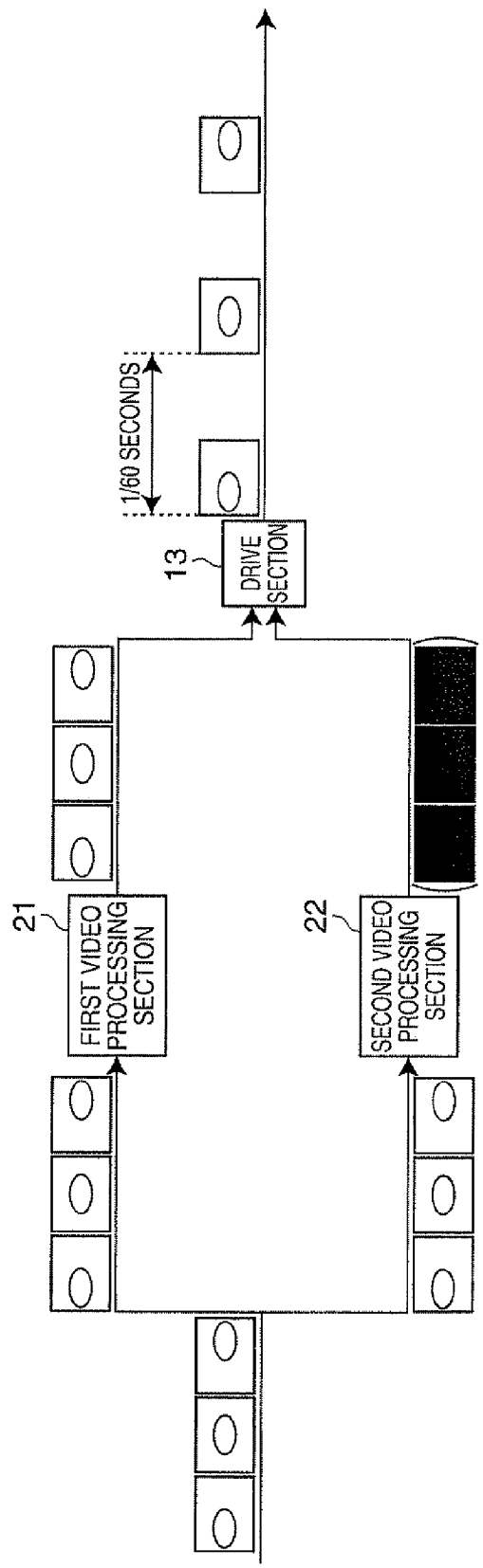
FIG. 5 describes a two-dimensional video output process with no black screen insertion in the case of 2D-signal reception carried out by the projector.

In the projector 1 that is carrying out the two-dimensional video output process with no black screen insertion in the case of 2D signal reception, the video input section 11 outputs a video signal for two-dimensional video images to the first video processing section 21 and outputs the same video signal for two-dimensional video images to the second video processing section 22, as shown in FIG. 5. The first video processing section 21 then performs the same video processing as that performed in the stereoscopic video output process to produce a video signal for two-dimensional images, and the second video processing section 22 produces a video signal for black screen insertion. The procedure described above is the same as that carried out in the video output process with black screen insertion in the case of 2D signal reception. Subsequently, however, the drive section 13 outputs only a first drive signal based on the video signal for two-dimensional video images that has been produced by the first video processing section 21 but outputs no second drive signal based on the video signal for black screen insertion that has been produced by the second video processing section 22. The projection section 14 therefore performs no black screen insertion, that is, displays only the two-dimensional video images but does not display the video images for black screen insertion. In this case as well as the case described above, the first drive signal is outputted at the cycle of 1/60 sec, which is the same cycle as that used in the stereoscopic video display, and the two-dimensional images are displayed at the frame rate of 60 frames/second, which is a normal frame rate.

As described above, the user can choose whether or not black screens are inserted in the display operation, whereby the convenience of the user can be improved.

In the present embodiment, in which the second video processing section 22 produces a video signal for black screen insertion but the drive section 13 outputs no second drive signal based on the produced video signal, the second video processing section 22 may alternatively be configured to produce no video signal for black screen insertion at all.

Still alternatively, the second video processing section 22 may also perform the same video processing as that performed in the stereoscopic video output process to produce a video signal for two-dimensional images, and the drive section 13 may alternately output the first drive signal based on the video signal for two-dimensional video images that has been produced by the first video processing section 21 and a second drive signal based on the video signal for two-dimensional video images that has been produced by the second video processing section 22. In this case, since the same two video images are displayed during a period of 1/60 sec, the video images are outputted at a cycle of 1/60 sec, whereby the two-dimensional video output process with no black screen insertion in the case of 2D signal reception can be carried out.

Figure 6:
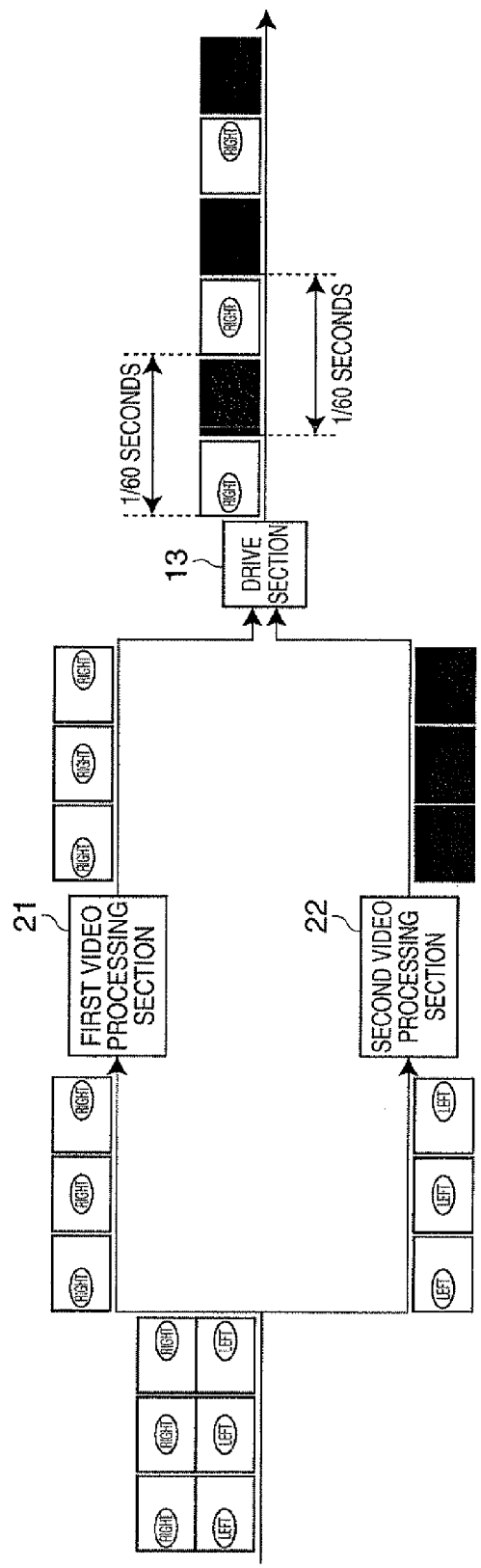
FIG. 6 describes a two-dimensional video output process with black screen insertion in the case of 3D-signal reception carried out by the projector.

In the projector 1 that is performing the two-dimensional video output process with black screen insertion in the case of 3D signal reception, the video input section 11 outputs a video signal for the right eye to the first video processing section 21 and outputs a video signal for the left eye to the second video processing section 22, as shown in FIG. 6. The first video processing section 21 performs the same video processing as that performed in the stereoscopic video output process to produce a video signal for the right eye. On the other hand, the second video processing section 22 produces a video signal for black screen insertion.

Subsequently, the drive section 13 alternately outputs a first drive signal based on the video signal for the right eye produced by the first video processing section 21 and a second drive signal based on the video signal for black screen insertion produced by the second video processing section 22. The projection section 14 then performs black screen insertion, that is, alternately displays images for the right eye and video images for black screen insertion. The user recognizes the video images for the right eye as normal two-dimensional images. Therefore, when the user desires not to display a stereoscopic video displayable content as stereoscopic video images but desires to display the stereoscopic video images as two-dimensional video images, black screens can be inserted as in the case where a video signal for two-dimensional video images is acquired.

Figure 7:
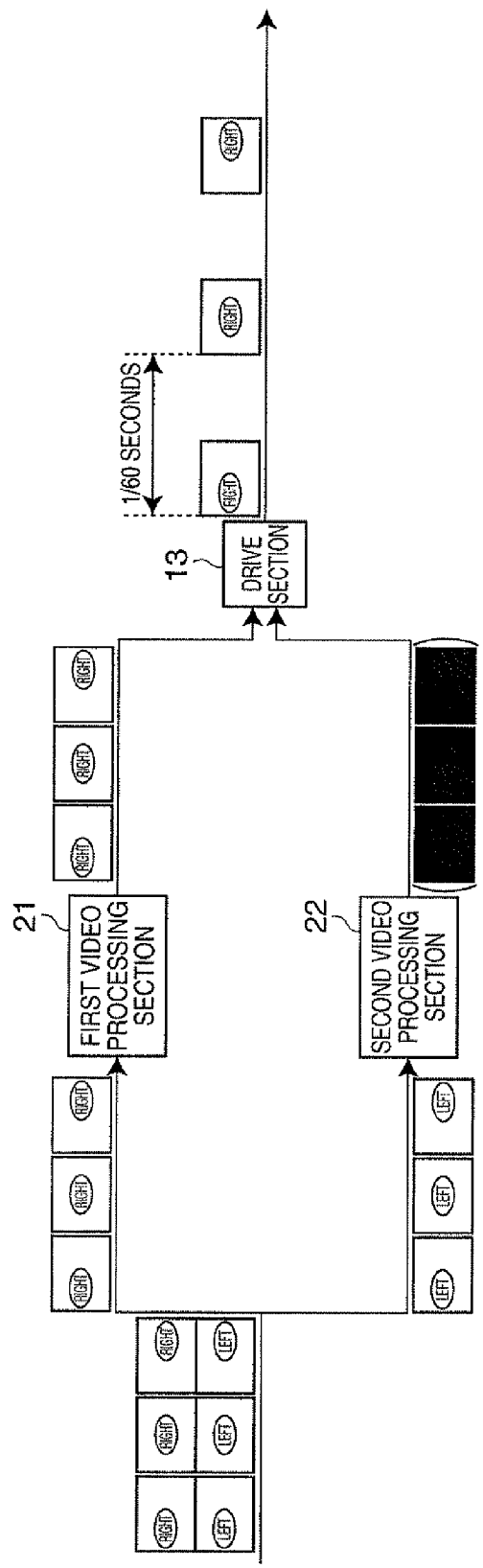
FIG. 7 describes a two-dimensional video output process with no black screen insertion in the case of 3D-signal reception carried out by the projector.

In the projector 1 that is performing the two-dimensional video output process with no black screen insertion in the case of 3D signal reception, the video input section 11 outputs a video signal for the right eye to the first video processing section 21 and outputs a video signal for the left eye to the second video processing section 22, as shown in FIG. 7. The first video processing section 21 performs the same video processing as that performed in the stereoscopic video output process to produce a video signal for the right eye. On the other hand, the second video processing section 22 produces a video image signal for black screen insertion. The procedure described above is the same as that carried out in the video output process with black screen insertion in the case of 3D signal reception. Subsequently, however, the drive section 13 outputs only a first drive signal based on the video signal for the right eye produced by the first video processing section 21 but outputs no second drive signal based on the video signal for black screen insertion produced by the second video processing section 22. The projection section 14 therefore performs no black screen insertion, that is, displays only video images for the right eye but displays no video images for black screen insertion. In this case as well as the case described above, the first drive signal is outputted at the cycle of 1/60 second, which is the same cycle as that used in the stereoscopic video display, and the video images for the right eye are displayed at the frame rate of 60 frames/second, which is the normal frame rate.

Alternatively, the second video processing section 22 may also perform the same video processing as that performed in the stereoscopic video output process to produce a video signal for two-dimensional video images, and the drive section 13 may alternately output the first drive signal based on the video signal for two-dimensional video images that has been produced by the first video processing section 21 and a second drive signal based on the video signal for two-dimensional video images that has been produced by the second video processing section 22. In this case, since the same two video images are displayed during a period of 1/60 second, the video images are outputted at a cycle of 1/60 second, whereby the two-dimensional video output process with no black screen insertion in the case of 3D signal reception can be carried out.

As described above, the user can choose whether or not black screens are inserted in the display operation, whereby the convenience of the user can be improved.

In the present embodiment, in which the second video processing section 22 produces a video signal for black screen insertion but the drive section 13 outputs no second drive signal based on the produced video signal, the second video processing section 22 may alternatively be configured to produce no video signal for black screen insertion at all.

As described above, according to the projector 1 of the present embodiment, which alternately displays images for the right eye and images for the left eye for stereoscopic vision, two-dimensional video images can be displayed with black screens inserted without insufficient brightness or flickering by using the same video output method as that used in the stereoscopic image display. The degree of motion picture blurring can thus be reduced.

The present embodiment has been described with reference to the projector 1, but the invention is also applicable to a liquid crystal television receiver or any other video display apparatus including a hold-type display section as well as the projector 1.

The projector 1 according to the present embodiment, which includes the lamp 32 as a light source, can alternatively use an LED (light emitting diode) light source, a laser or any other solid-state light source, or any other suitable light source.

The entire disclosure of Japanese Patent Application No. 2012-46907, filed Mar. 2, 2012 is expressly incorporated by reference herein.

What is claimed is:

1. A video display apparatus comprising:
a memory; and
a processor configured to:
carry out a display process based on a drive signal;
acquire a video signal;
determine whether the video signal is a two-dimensional video signal or a stereoscopic video signal;
perform first video processing and second video processing on the acquired video signal; and
output to a display: (i) a first drive signal based on the video signal having undergone the first video processing at a fixed cycle, and (ii) a second drive signal based on the video signal having undergone the second video processing at the same cycle as the cycle at which the first drive signal is outputted but at a timing that is shifted from a timing of the first drive signal by one-half the cycle, wherein
when the processor determines that the acquired video signal contains stereoscopic video images, the first video processing produces a video signal for one of the right and left eyes, and the second video processing produces a video signal for the other one of the right and left eyes,
when the processor determines that the acquired video signal contains two-dimensional video images, the first video processing produces a video signal for two-dimensional video images, and the second video processing produces a video signal for black screen insertion, and
the processor is further configured to:
determine, based on user input, whether stereoscopic video images contained in the acquired video signal are to be displayed as stereoscopic video images or two-dimensional video images, and
when the stereoscopic video images are determined to be displayed as two-dimensional video images, the second video processing is replaced by a video processing that produces a video signal for black screen insertion.

2. The video display apparatus according to claim 1, wherein the processor is further configured to:
determine, based on user input, whether or not black screens are to be inserted when two-dimensional video images are displayed, and
prevent output of the second drive signal, when it is determined that the black screens are to be inserted.

3. The video display apparatus according to claim 1, wherein the processor is further configured to:
determine, based on user input, whether or not black screens are to be inserted when two-dimensional video images are displayed, and
when the stereoscopic video images are determined to be displayed as two-dimensional video images, and it is determined that black screens are to be inserted when two-dimensional video images are displayed, prevent output of the second drive signal.

4. A video display method comprising:
acquiring a video signal;
determining, by a processor, whether the video signal is a two-dimensional video signal or a stereoscopic video signal;
performing first video processing and second video processing on the acquired video signal; and
outputting to a display: (i) a first drive signal based on the video signal having undergone the first video processing at a fixed cycle, and (ii) a second drive signal based on the video signal having undergone the second video processing at the same cycle as the cycle at which the first drive signal is outputted but at a timing that is shifted from a timing of the first drive signal by one-half the cycle, wherein
when the processor determines that the acquired video signal contains stereoscopic video images, the first video processing produces a video signal for one of the right and left eyes, and the second video processing produces a video signal for the other one of the right and left eyes,
when the processor determines that the acquired video signal contains two-dimensional video images, the first video processing produces a video signal for two-dimensional video images, and the second video processing produces a video signal for black screen insertion, and
the processor is further configured to:
determine, based on user input, whether stereoscopic video images contained in the acquired video signal are to be displayed as stereoscopic video images or two-dimensional video images, and
when the stereoscopic video images are determined to be displayed as two-dimensional video images, the second video processing is replaced by a video processing that produces a video signal for black screen insertion.

* * * * *